Patented Feb. 17, 1931

1,793,020

UNITED STATES PATENT OFFICE

WALTER SCHOELLER, OF BERLIN-CHARLOTTENBURG, HANS JORDAN, OF BERLIN-STEGLITZ, AND REINHARD CLERC, OF BERLIN, GERMANY, ASSIGNORS TO THE FIRM SCHERING-KAHLBAUM A. G., OF BERLIN, GERMANY

METHOD OF PRODUCING MENTHOL

No Drawing. Application filed November 22, 1928, Serial No. 321,267, and in Germany November 24, 1927.

Our invention refers to the production of menthol and has for one of its objects a method whereby menthol can be produced from hydroxythymol, a compound first described by Eries and Fickewirth in Annalen der Chemie, vol. 362, page 40, as having the constitution

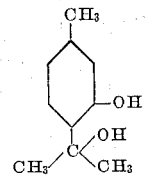

and, on being heated, being converted, by the splitting off of water, into 3-methyl-6-isopropylene phenol.

We have now found that if the heating operation accompanied by the splitting off of water is carried through in the presence of hydrogen and of one of the well known hydrogenation catalysts, the non-saturated side-chain will be saturated with the aid of catalytically combined hydrogen.

If the reaction is carried to the point where 8 atoms hydrogen have entered the molecule, a mixture of stereoisomer menthols is obtained, which can be acted upon in a well known manner for the production of racemic menthol.

The process according to the present invention can also be carried through in the presence of a solvent and/or under elevated pressure, as usual in hydrogenation processes.

Example 1

Hydroxythymol is treated in an autoclave at about 130–180° C. with hydrogen in the presence of a hydrogenation catalyst, for instance a nickel catalyst, until 8 atoms hydrogen have entered into combination. A good yield of a mixture of stereoisomer menthols is obtained.

Example 2

Hydroxythymol is dissolved in an equal quantity of menthane and further treated as described with reference to Example 1. The hydroxythymol is quantitatively converted into a mixture of menthols which is freed from the solvent by distillation.

Various changes may be made in the details disclosed in the foregoing specification without departing from the invention or sacrificing the advantages thereof.

We claim:—

1. The method of producing menthol comprising acting with hydrogen at a temperature of 130–180° C. in the presence of a hydrogenation catalyst on hydroxythymol, until 8 atoms hydrogen have been combined.

2. The method of producing menthol comprising acting with hydrogen at a temperature of 130–180° C. in the presence of a solvent and a hydrogenation catalyst on hydroxythymol, until 8 atoms hydrogen have been combined.

3. The method of producing menthol comprising acting with hydrogen at a temperature of 130–180° C. and under a pressure above normal in the presence of a hydrogenation catalyst on hydroxythymol, until 8 atoms hydrogen have been combined.

In testimony whereof we affix our signatures.

WALTER SCHOELLER.
HANS JORDAN.
REINHARD CLERC.